April 29, 1952

H. G. ANDRÉ

2,594,712

SILVER AND ZINC ACCUMULATOR HAVING
AN INSOLUBLE NEGATIVE ELECTRODE
Filed June 11, 1949

INVENTOR
HENRI G. ANDRE
BY: Karl F. Ross
AGENT

Patented Apr. 29, 1952

2,594,712

UNITED STATES PATENT OFFICE 2,594,712

SILVER AND ZINC ACCUMULATOR HAVING AN INSOLUBLE NEGATIVE ELECTRODE

Henri G. André, Montmorency, France, assignor to Yardney International Corp., New York, N. Y., a corporation of New York Application June 11, 1949, Serial No. 98,433
In France February 22, 1949

9 Claims. (Cl. 136—6)

1

This invention relates to the silver and zinc accumulators and aims more particularly at accumulators comprising electrodes constituted by a flat bag containing the active material in the form of a finely divided powder within a sheet of semi-permeable material a typical example of which is regenerated cellulose or cellophane, the alkaline electrolyte being distributed in the said semi-permeable material in a compressed state.

The invention contemplates such accumulators in which the power generating cell is obtained by coupling side by side such electrodes-bags and commonly folding them along a mid-line so as to give them the shape of a U.

One object of the invention is to provide an accumulator of this type capable of developing a very high power by fully using the intrinsic rapidity of the electrochemical transformations of the silver compounds.

Another object of the invention is to provide an accumulator which may be subjected to a considerable number of successive charges and discharges without losing its qualities.

Another object of the invention is to provide an accumulator which has a very long life, when very often used as well as when remaining unused, and this without taking any special precautions.

Another object of the invention is to provide an accumulator which is practically insensitive to the composition of the atmosphere which surrounds it.

There is described hereafter as an illustration one embodiment of an accumulator according to the invention, referring to the accompanying drawing, in which.

Figure 1:
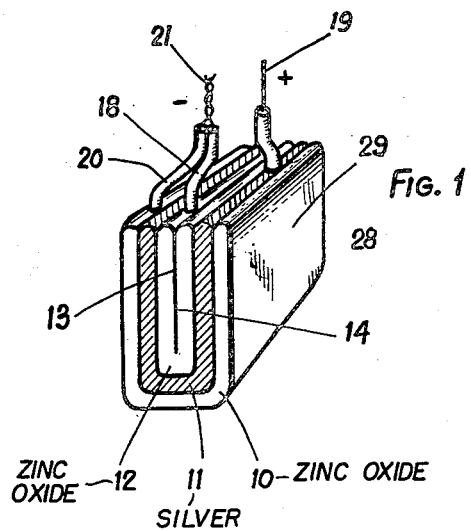
Fig. 1 is a part cross-section of an active cell.

The generative cell comprises three coupled U-shaped bags, viz. an outer bag 10, an intermediate bag 11 and an inner bag 12. The outer bag contains a finely divided material which, according as whether the generator is charged or discharged, is zinc powder and/or zinc hydroxide powder. The intermediate bag 11 contains, according as whether the generator is charged or discharged, finely divided silver and/or silver oxide. The inner bag 12 contains the same material as the outer bag 10. The inner faces 13 and 14 of the generating cell are coupled side by side.

The bag envelope is constituted by a semi-permeable material such as regenerated cellulose sheet. In bag 10 is immersed a conducting member 18 insulated by a coating made of rubber or any other material which is capable of resisting the electrolyte, the said member being adapted to

2 conduct the current in the zinc-containing powder mass. In bag 11 is immersed a conductor 19 also coated with rubber for conducting the current to the positive electrode. In bag 12 is immersed an insulated conductor 20 for conducting the current in the zinc-containing powder mass. The conducting members 18 and 20 are tied together so as to constitute a single conductor 21 projecting out of the insulating tubes. The positive electrode 11 is thus enclosed on either side within bags 10 and 12 which constitute the negative electrode.

Figure 2:
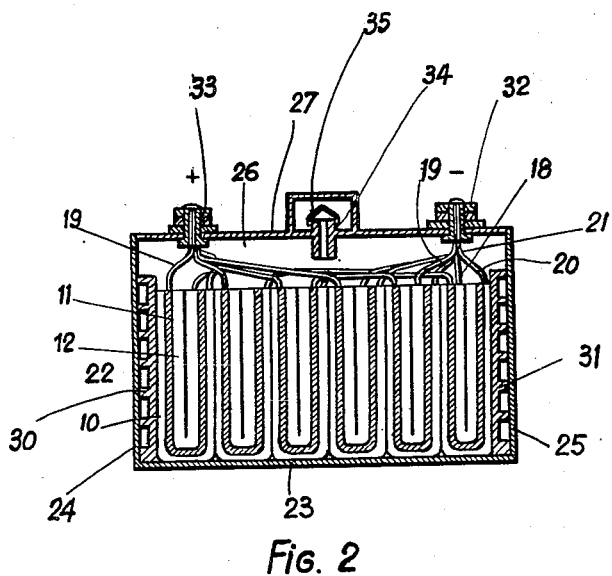
Fig. 2 is a sectional view of an accumulator.

Fig. 2 is a sectional view of one embodiment of an accumulator comprising a number of such generating cells. The said accumulator comprises a box 22 having a generally parallelepipedic shape made, for example, of styrene resin and having thin walls. The said box comprises a bottom 23, end walls 24 and 25, side walls 26 and a cover 27. A number of active cells 28 such as described above have been arranged within the box, each cell being constituted by a positive electrode bag 11 clamped between two bags 10 and 12 constituting the negative electrode. Faces 29 constituting the arms of the U-shaped cell are parallel to the end walls 24 and 25. The end active cells are not directly in contact with walls 24 and 25. They are separated therefrom by brackets 30 and 31 the cross-section of which has the shape of a comb the teeth of which bear against the said walls. When assembling the parts of the accumulator, the cells are introduced in the dry state into the box containing the brackets, the overall thickness of the cells being just sufficient to allow for their introduction. When pouring the alkaline electrolyte into the box, the cells swell owing to the absorption of said electrolyte by the semi-permeable material constituting the envelope of the electrode bags. Under the effect of this swelling, the thickness of the cells tends to increase, i. e. first of all the distance between the outer faces 29 of the U arms. It results therefrom a compression of said cells which take their bearing on the side walls 23 and 24 reinforced by the brackets 30 and 31 and which may reach one or two tens of Kg./dm.$^2$. The electrolyte is poured in such an amount that it is not present in the state of free liquid.

The output conductors 19 and 21 of the various cells are connected to terminals 32 and 33 of usual type, respectively. Cover 26 is provided with a mouth or neck 34 which, according to the invention, carries a nipple 35 made of rubber or the like and through which the gases may escape out of the box but which prevents the atmosphere gases from penetrating into the box. This nipple which has a generally cylindrical shape clamps resiliently at its lower end mouth 34. The said nipple is drilled, for example by means of a needle, to provide for the escape of the gases. The inner face of the mouth may be coated with a pad of cellulose paper similar to blotting-paper and obtained, for example, by rolling a strip.

Such an accumulator finds a particularly advantageous use in all cases when a considerable instantaneous or substantially instantaneous power is desired, e. g., for starting motors and more particularly multi-cylinder motors such as plane or car motors, or for electric traction, etc.

The power produced by a cell according to the invention is in fact considerably higher, all other things being equal, than that produced by a cell comprising only two coupled bags. In practice, it has been found that such a cell may, with the same volume, produce a power at least twice highed than that of a cell comprising only two bags.

The invention contemplates besides other means which are also favorable to the obtention of high power accumulator having a great capacity and a small internal resistance.

According to the invention, the active materials of the electrodes are enclosed by different thicknesses of semi-permeable material according as whether the positive or negative electrode is concerned.

Generally speaking, the invention contemplates for the positive electrode an envelope having a thickness which is about one and a half times higher than that of the neative electrode envelope. This thickness difference may be easily obtained by winding around the positive electrode a greater number of cellophane sheet turns than around the negative electrode.

According to one embodiment, the active material of the positive electrode and the active material of the negative electrode are first packed each into one cellophane sheet. The bags thus obtained are in turn enveloped each into one cellophane strip by winding, the turn number of the winding being greater for the positive electrode than for the negative electrode. After folding of the marginal areas projecting with respect to the bags, the sleeves thus obtained are packed into one cellophane sheet: the electrode-bags of which the coupling constitutes the generating cell are thus obtained.

The particular qualities of a cell having this feature may be explained in the following manner:

During the first charges and discharges of the accumulator, the active oxygen changes the physical structure of the outer layers of the positive electrode envelope by giving to the regenerated cellulose a porous state so that it loses its semi-permeability nature and becomes permeable. After the first operation cycles, this effect takes place no more than that it may be thought that in normal operation, and after the destruction of the outer layers of the positive electrode envelope, the positive and negative electrodes have envelopes of substantially equal thicknesses and qualities. Without this improvement, that is with windings of the same thickness for both electrodes, it would be necessary to select for the electrodes a number of winding turns which is either too great for the negative electrode, which increases the internal resistance of the cell, or too small for the positive electrode, which might reduce the life duration of the said cell.

As a mere illustration, having no restrictive nature, it may be mentioned that good results have been obtained by using cellophane having a thickness of 0.025 mm., while selecting for the winding of the positive electrode a number of turns comprised between 6 and 10 and for the negative electrode winding a number of turns comprised between 4 and 6.

Having now described and illustrated one form of my invention, I wish it to be understood that my invention is not to be limited to the specific form or arrangement of parts herein described and shown, or specifically covered by my claims, except in so far as such limitations are specified in the appended claims.

I claim:

1. In an electrochemical generator of energy, in combination, a first electrode of one polarity, and a second and a third electrode of opposite polarity, said first and second electrodes each comprising an electrochemically active material and an electrolyte-permeable insulating envelope enclosing said material, said envelope being folded substantially in the form of a U with upstanding arms, the arms of the U of said second electrode enfolding said first electrode, the arms of the U of said first electrode enfolding said third electrode.

2. In an electrochemical generator of energy, in combination, a first electrode of one polarity, and a second and a third electrode of opposite polarity, each of said electrodes comprising an electrochemically active material and an electrolyte-permeable insulating envelope enclosing said material, said envelope being folded substantially in the form of a U with upstanding arms, said first electrode being sandwiched between said second and third electrodes, the arms of the U of said second electrode enfolding said first electrode, the arms of the U of said first electrode enfolding said third electrode.

3. The combination according to claim 2 wherein said first electrode is of positive polarity.

4. An electric storage battery comprising a container, an alkaline electrolyte in said container, said electrolyte being saturated with zinc, a set of three electrodes in said electrolyte including a pair of electrodes of mutually opposite polarities and a third electrode having the same polarity as one of the electrodes of said pair, said pair of electrodes comprising a negative electrode containing zinc as an active material and a positive electrode containing a metal more electropositive than zinc as an active material, each of the electrodes of said pair comprising an electrolyte-permeable envelope of insulating material enclosing the said active material thereof, each of said envelopes being folded substantially in the form of a U with upstanding arms, the arms of said one electrode of said pair enfolding the other electrode of said pair, the arms of said other electrode enfolding said third electrode, and means including said container maintaining said envelopes under compression, thereby regulating the size of the pores thereof and enabling repeated recharging of the battery.

5. An electric storage battery according to claim 4 wherein said more electropositive metal is silver.

6. An electric storage battery according to claim 4 wherein said other electrode is of positive polarity.

7. An electric storage battery comprising a container, an alkaline electrolyte in said container, said electrolyte being saturated with zinc, a set of three electrodes in said electrolyte including at least one negative electrode containing comminuted zinc as an active material and at least one positive electrode containing an electrochemically active powder more electropositive than zinc as an active material, two of said electrodes being substantially identical and of one polarity, the third of said electrodes being of opposite polarity, each of said three electrodes comprising an electrolyte-permeable envelope of insulating material enclosing the said active material thereof, each of said envelopes being folded substantially in the form of a U with upstanding arms, said third electrode being sandwiched between said two substantially identical electrodes, the arms of one of the latter electrodes enfolding said third electrode, the arms of said third electrode enfolding the remaining one of said electrodes, and means including said container maintaining said envelopes under compression, thereby regulating the size of the pores thereof and enabling repeated recharging of the battery.

8. An electric storage battery according to claim 7 wherein said electrochemically active powder is comminuted silver.

9. An electric storage battery according to claim 7 wherein said third electrode is of positive polarity.

HENRI G. ANDRÉ.

REFERENCES CITED

The following references are of record in the file of this patent:

UNITED STATES PATENTS

| Number | Name | Date |
| --- | --- | --- |
| 678,512 | Perry | July 16, 1901 |
| 1,955,115 | Drumm | Apr. 17, 1934 |
| 2,317,711 | Andre | Apr. 27, 1943 |
| 2,505,876 | Baker | May 2, 1950 |

FOREIGN PATENTS

| Number | Country | Date |
| --- | --- | --- |
| 29,318 | Great Britain | of 1911 |